United States Patent [19]

Aebersold et al.

[11] Patent Number: 5,749,511
[45] Date of Patent: May 12, 1998

[54] METHOD AND APPARATUS FOR CONNECTING TWO WORKPIECES TOGETHER

[75] Inventors: Hans Aebersold, Birmensdorf; Norbert Gross, Zürich; Werner Urech, Kaiserstuhl, all of Switzerland

[73] Assignee: Elpatronic AG, Zug, Switzerland

[21] Appl. No.: 646,996

[22] Filed: May 9, 1996

[30] Foreign Application Priority Data

May 15, 1995 [CH] Switzerland ............. 01 409/95

[51] Int. Cl.⁶ ................. B23K 15/00; B23K 31/02
[52] U.S. Cl. .............. 228/212; 228/106; 219/121.64; 219/158
[58] Field of Search ................ 228/212, 214, 228/173.6, 106, 182; 219/121.82, 121.63, 121.64, 158, 243

[56] References Cited

U.S. PATENT DOCUMENTS

| | | |
|---|---|---|
| 3,743,813 | 7/1973 | Opprecht . |
| 4,811,936 | 3/1989 | Laymaster . |
| 5,007,467 | 4/1991 | Nelles ................. 141/1.1 |
| 5,328,083 | 7/1994 | Gilles et al. . |
| 5,357,077 | 10/1994 | Tsuruta . |

FOREIGN PATENT DOCUMENTS

| | | |
|---|---|---|
| 0 438 615 A1 | 7/1991 | European Pat. Off. . |
| 0 532 853 A1 | 3/1993 | European Pat. Off. . |
| 0 565 088 A1 | 10/1993 | European Pat. Off. . |
| 0 565 846 A1 | 10/1993 | European Pat. Off. . |

*Primary Examiner*—Samuel M. Heinrich
*Attorney, Agent, or Firm*—McCormick, Paulding & Huber

[57] ABSTRACT

In a method for connecting two workpieces together by a welded seam, the workpieces are held in a welding station between opposed tracks consisting of a plurality of members. The tracks run around guide rollers in a conveying direction. A clearance (a) between the guide rollers which come first in the conveying direction can be changed upon insertion of the workpieces between the tracks.

7 Claims, 2 Drawing Sheets

METHOD AND APPARATUS FOR CONNECTING TWO WORKPIECES TOGETHER

BACKGROUND OF THE INVENTION

The invention relates to a method and apparatus for connecting two workpieces together by a welded seam, in which the workpieces are held between opposed moving tracks or chains comprising a plurality of members, running around guide rollers in a conveying direction; and an apparatus for the same.

Various welding processes are known for joining two workpieces together, particularly for the fabrication of body components for motor vehicles. Especially worthy of note is laser welding in which the sheet-metal parts are butt-welded to form compound panels.

In the nature of things, the edges of the sheets which are to be welded together are not absolutely straight, and have a certain amount of waviness. This means that the butt joint is closed only where the wavy edges are in contact; at other points the edges stand back from one another, leaving the joint open. According to the industry standard in Europe for laser welding, the gap should not exceed a width of 0.08 mm at any point. This very small tolerance makes it necessary to prepare the edges of the sheets for welding. This is usually done by trimming by laser beam. However, it may also be done by a process according to EP-A 0565846, in which the sheets are butted together and at least one edge is then plastically deformed against the other, closing the gap so that its maximum width no longer exceeds 0.08 mm.

A welding operation usually has the following cycle.

The workpieces are butted together in pairs, without prepared edges, positioned without significant sideways pressure, and fixed by means of clamp elements. At this point the workpieces are first subjected to force. The workpieces may then be processed, for example they may be dressed as described in EP-A 0565846, to bring the gap within the permitted tolerance. This processing causes a second application of force to the positioning system, in which considerable lateral forces can occur. Finally, further mainly sideways acting force effects occur as a result of thermal stresses in the laser welding process.

These forces are capable of affecting the joint gap, particularly if the tolerances in the machine allow relative movement of the sheets to be welded.

A machine for joining workpieces together by means of a laser beam is known from U.S. Pat. No. 5,328,083. This machine is divided into four zones. In the first zone, a first workpiece is positioned. In the second zone, a second workpiece is brought laterally up to the first workpiece so that the two workpieces form a butt joint. In a third zone, the workpieces are then fed together to a welding station, ie. they are made to pass under a laser beam. Here the two workpieces are joined together by a welded seam. In a fourth zone, discharge of the workpieces, now welded together, takes place.

The pass of the first workpiece through the second and third zones and the pass of the second workpiece through part of the second zone and the third zone take place between opposed moving tracks. These run at constant speed, so that the feed of the workpieces to the tracks also takes place under constant speed conditions. The workpieces are grasped and "snatched away" by the tracks. This action is very abrupt, as the clamping must be capable of accepting the abovementioned lateral forces, and operates with correspondingly large forces. Positioning problems arise through relative movement of the workpieces until they are completely gripped by the tracks.

Furthermore, because one workpiece is positioned first and then the second workpiece is positioned and aligned with the first workpiece, the overall length of the machine is rather large. Moreover, a certain distance has to be maintained between successive pairs of workpieces, and this increases the unproductive time during which no welding can be done. To a certain degree this could be remedied by making the feed conveyor run faster. However, this results in increased transfer difficulties.

SUMMARY OF THE INVENTION

An object which lies at the basis of the present invention is to provide an apparatus and a method of the abovementioned kind by means of which the workpieces can be guided precisely with respect to the laser, without disturbing the joint, as soon as the workpieces have been positioned side by side. Further advantages that may be obtained by the invention are the assurance of a continuous operation of the tracks with relatively little unproductive time and a reduction of the space requirements for the machine.

To provide the possibility of achieving the stated object, the clearance in the first section of the path of the tracks (ie. "first" in the conveying direction) is changed upon insertion of the workpieces between the tracks.

This can greatly facilitate insertion of the workpieces between the tracks, and allows the operation to be carried out more gently. For the clearance to be varied in the first section of the tracks, they can open like a jaw, so that the workpieces can be inserted completely between the tracks. Preferably insertion is deep enough for the workpieces next in line to be advanced close to the trailing edges of the workpieces which are on the point of being processed. Once the workpieces are between the tracks, the clearance is removed; the workpieces are then clamped instantaneously over their entire length, so that relative displacement between the workpieces does not occur.

In one embodiment, the welding station proper, with tracks and welding unit, is supplied by a feed unit which places the workpieces between the tracks. For the sake of simplicity this feed unit may comprise a manipulator with a horizontal slit into which the workpieces are inserted. Inside the slit are the necessary clamp elements for holding the workpieces.

For the sake of simplicity, receiving rollers on which the workpieces are laid are provided on either side of the horizontal slit. The workpieces are pushed towards each other and into the slit until they come into contact in the region of the butt joint. The workpieces are then clamped, and the feed unit is traversed towards the welding station.

To reduce the joint gap, a profiling roller has—according to EP-A 0565846—proved highly effective: it makes a notch or groove in the workpieces on one or both sides of the joint. In the present example, this profiling roller is combined with the feed unit; but it can also be mounted at the welding station ahead of the welding unit. If it is combined with the feed unit, it preferably operates as the workpieces are being ejected or withdrawn from the horizontal slit.

In a preferred embodiment, the tracks are driven between welding operations, at a different, and preferably higher, travel speed than the welding travel speed.

This has the effect of shortening the time during which no welding takes place. During this time, it is also proposed that the workpieces be inserted between the tracks and removed from them, at a higher speed than the welding speed. This is facilitated if the clearance between the tracks is varied as described above. This method should be adopted especially for workpieces whose component length is greater than the length of the actual weld, since it shortens the "unproductive" time during which no weld seam is being produced.

The tracks, which can resemble tank tracks, are preferably arranged as a pair of tracks one above the other, and the individual workpiece is guided between these tracks. Since two workpieces are involved, two pairs of such tracks are provided, arranged side by side.

These tracks have the advantage that they allow the workpieces which are to be joined together to be continuously conveyed in close succession. The workpieces are inserted between the tracks at one end and are removed at the other end. This means that newly supplied workpieces and workpieces which have been welded do not interfere with each other.

The important point is that the workpieces are held in precise alignment. This requires a considerable pressure to be brought to bear on the workpieces by the tracks in order that the workpieces do not shift in any direction between the tracks. Therefore each track has a plurality of members which press on the workpieces. The pressure may be generated by any desired hydraulic or pneumatic device, and need not be the same for all the members. The pressure should be high enough to counteract any waviness of the workpieces due to the heat given off by the weld seam.

In order to obtain a joint gap as small as possible, it is further proposed that the individual track members be set so that the workpieces tend to move towards one another. For example, this can be achieved by setting the members at a certain angle to the conveying direction such that the workpieces are urged towards each other. Another possibility is for the members and therefore for the workpieces to be displaced transversely across the conveying direction by corresponding baffles, guides, or applications of external force at right angles to the welding device. These will offset the forces tending to widen the joint gap.

Each track, and its individual members, preferably forms an endless chain passing around corresponding guide rollers. The number of guide rollers is immaterial, and may be varied as required.

BRIEF DESCRIPTION OF THE DRAWINGS

Further advantages, features and particulars of the invention will be revealed by the following description of preferred embodiments given by way of example, and with reference to the drawings, in which.

DESCRIPTION OF THE PREFERRED EMBODIMENTS

Figure 1:
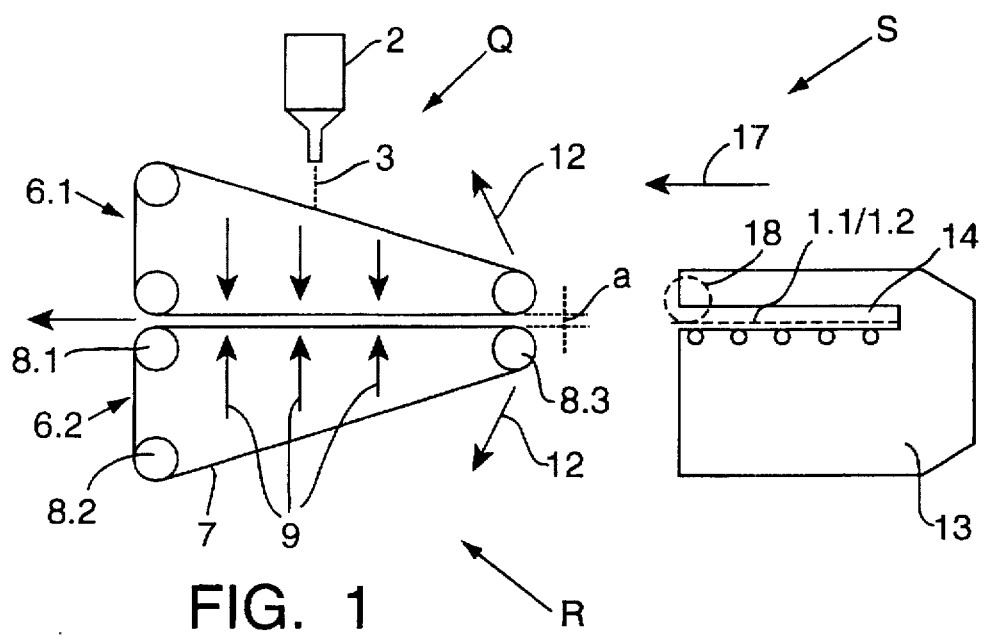
FIG. 1 is a diagrammatic side view of an apparatus according to the invention for joining two workpieces together.
Figure 2:
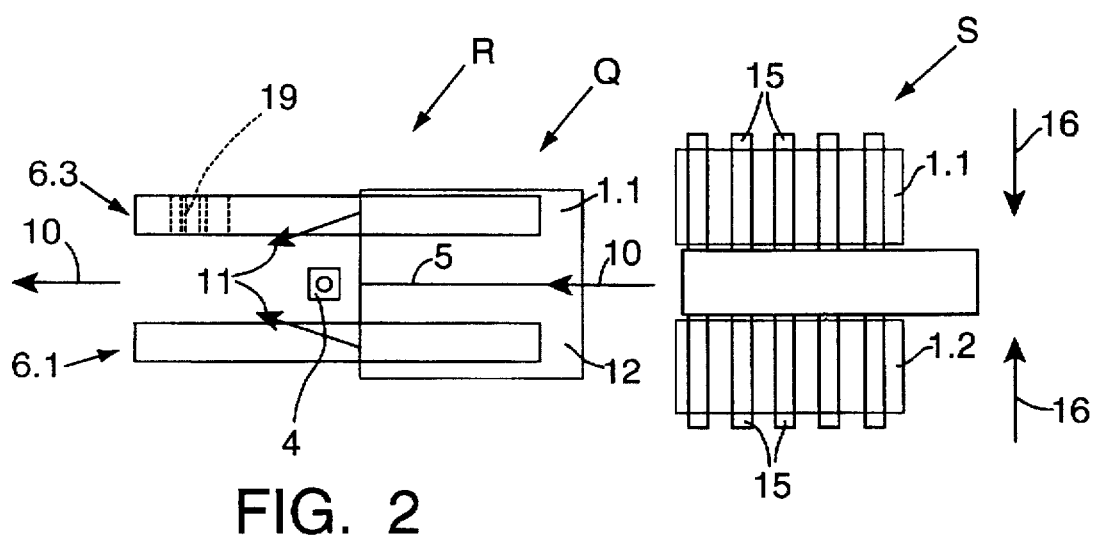
FIG. 2 is a plan view of the apparatus according to FIG. 1.

An apparatus R according to the invention for joining two workpieces 1.1 and 1.2 together comprises, as shown in FIGS. 1 and 2, a feed unit S for workpieces 1.1 and 1.2, and a welding station Q for joining the two workpieces 1.1 and 1.2 together. The joining together of the two workpieces 1.1 and 1.2 is effected by means of a laser 2 which transmits a laser beam 3, a sensor 4 being provided opposite the laser 2 to detect the laser beam 3. The laser 2 welds the two workpieces 1.1 and 1.2 together in the region of a butt joint 5.

In the present embodiment, the laser 2 remains fixed, while the workpieces 1.1 and 1.2 are traversed past it so that there is relative movement of the laser beam along the butt joint 5. Tracks 6 are provided for traversing the workpieces 1.1 and 1.2. Two of the tracks 6.1 and 6.2, are shown arranged one above the other in FIG. 1. Two of the tracks 6.1 and 6.3, laterally inverted, are shown arranged side by side in FIG. 2. Obviously, another track, not shown, is provided alongside the track 6.2 and below the track 6.3.

Each track 6 comprises an endless belt 7 passing around guide rollers 8.1,8.2 and 8.3. Each endless belt 7 preferably comprises a large number of interconnected chain links 19. Each chain link 19 is designed to exert a pressure, indicated by arrows 9, on the workpieces 1.1 and 1.2. This pressure fixes the workpieces 1.1 and 1.2 and guides them in a precise manner. The pressures applied to the workpieces 1.1,1.2 by each chain link 19 may be different over the length of the path they are guided along.

Furthermore, the chain links 19 are set to run in a conveying direction 10 when the endless belt 7 circulates. This causes the workpieces 1.1 and 1.2 to move towards one another, as indicated by the arrows 11. However, the same effect can also be achieved by means of lateral guides, thrust plates, pressure cylinders, or the like.

To obtain better pickup of the workpieces 1.1 and 1.2, that is to say a deeper insertion of the workpieces 1.1 and 1.2 between the tracks 6, it may be found advantageous to make provision for movement of the guide rollers 8.3 at the end facing the feed unit F. Movement in the direction of the arrows 12 increases a clearance a between the endless belts of the tracks 6 so that the workpieces 1.1 and 1.2 can be inserted deeply between the tracks 6, and transferred more readily.

The feed unit S consists of a manipulator 13 which has a horizontal slit 14. Receiving rollers 15 on which the workpieces 1.1 and 1.2 are laid are provided on both sides of the horizontal slit 14. After being deposited on the receiving rollers 15, the workpieces 1.1 and 1.2 are brought together by being moved into the horizontal slit 14 in the direction of the arrows 16 employing any desired propelling mechanisms such as rollers or the like.

As soon as the workpieces 1.1 and 1.2 abut each other in the horizontal slit 14, the manipulator 13 closes the slit 14, gripping the workpieces 1.1 and 1.2.

To transfer the workpieces 1.1 and 1.2 to the welding station S, the manipulator 13 travels in the conveying direction 10 indicated by the arrow 17. In the region of the tracks 6 the workpieces 1.1 and 1.2 are gripped by the tracks 6 and pulled out of the horizontal slit 14; if necessary, the manipulator 13 may open to release them.

Upon withdrawal of the workpieces 1.1 and 1.2 at least one of the workpieces 1.1 and 1.2 is profiled in the region of the butt joint 5, as provided in EP-A 0565846. A profiling roller 18 is provided on the manipulator 13 for this purpose.

The speed $V_1$ at which loading of the manipulator 13 and transfer to the welding station Q occur is preferably faster than the speed $V_s$ of the two workpieces 1.1 and 1.2 during their actual joining together by laser welding. In this way, a continuous supply of workpieces for joining is assured, so that the apparatus R as a whole is able to operate continuously.

Moreover, a discharge unit (not shown) may also operate at a higher speed $V_2$ to ensure that the welded panels do not interfere with the feed at the welding point. Here it may be found desirable to make the clearance between opposing rollers 8.1 in the discharge area of the welding station S' (distance a of the embodiment shown) variable so that the welded panels can be removed.

Figure 3:
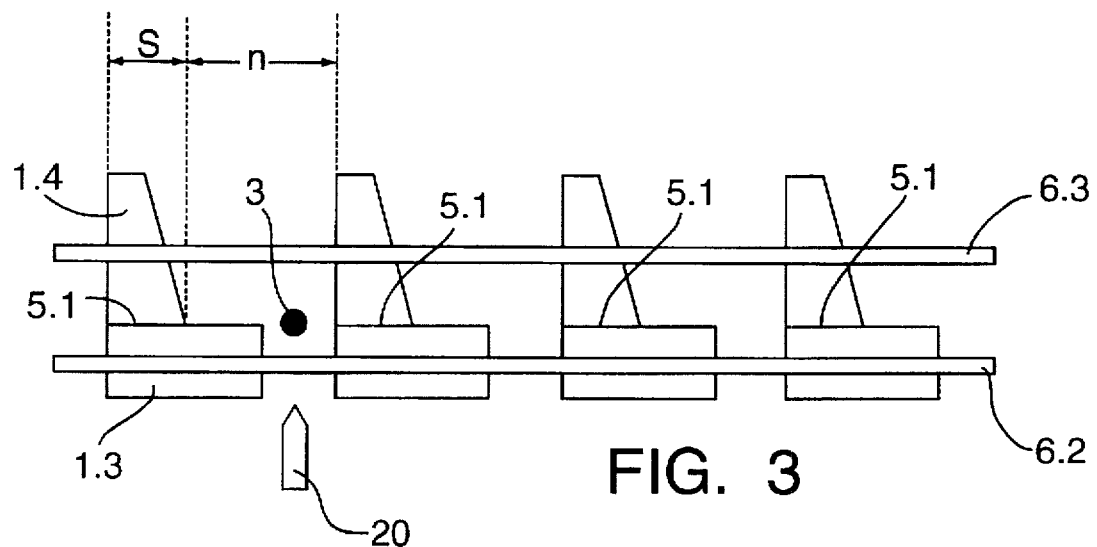
FIG. 3 is a diagrammatic plan view of the apparatus according to FIG. 1 for joining together two further examples of workpieces.
Figure 4:
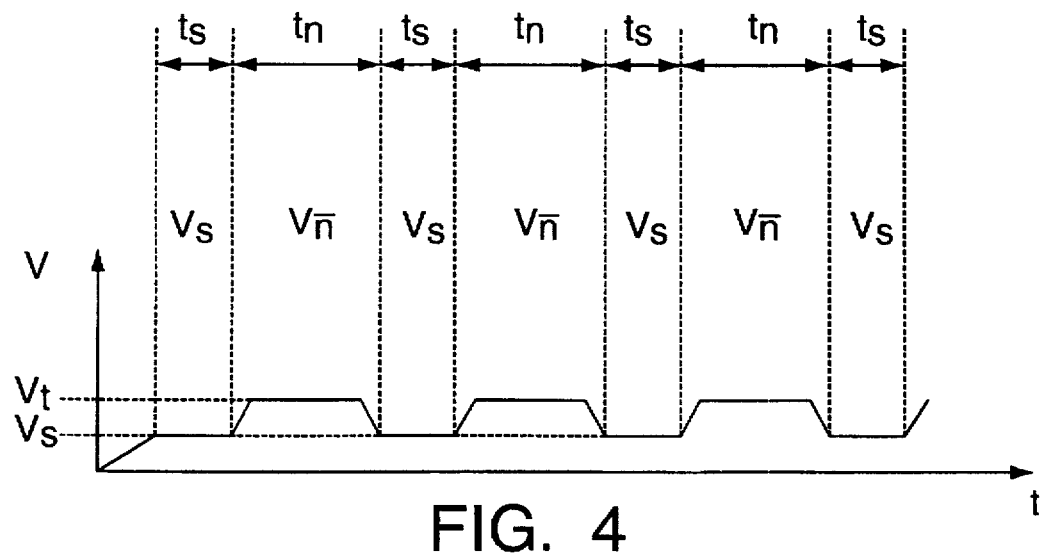
FIG. 4 shows a speed control for the apparatus according to FIG. 3, depicted linearly and as a diagram of speed plotted against time.

However, it is also proposed according to the invention that the tracks 6.1,6.2,6.3 should be drivable at varying speeds. This applies especially where workpieces 1.3 and 1.4 have different shapes and the length of the butt joint 5.1 is less than the length of at least one workpiece 1.3. This case is illustrated in FIG. 3. The welding length s is relatively short compared with the path length n in which no welding occurs. Accordingly, the tracks 6.1,6.2,6.3 are operated at one speed $V_s$ during the welding operation, but at a higher speed $V_n$ between welding operations. This control regime is illustrated in FIG. 4.

The speed control operates as follows.

The two butted workpieces 1.3 and 1.4 are fed by the feed unit F to the welding station S at a travel speed $V_1$. At the station S the workpieces 1.3 and 1.4 continue on their way at the welding speed $V_s$ so long as the presence of a butt joint 5.1 is detected. The welding speed is principally determined by the thinner of the two workpieces 1.3 and 1.4. At present, the welding speed lies approximately in the range of 2 to 15 m/min. As a rule the welding speed $V_s$ should be lower than the feed speed $V_1$.

For switching from feed speed $V_1$ to welding speed $V_s$ it will probably be found advisable to have a sensor 20 associated with the laser beam 3, to detect a unit (comprising the workpieces 1.3 and 1.4) approaching the laser beam 3.

A welded seam is then produced by the laser beam 3 in the region of the butt joint 5.1, joining the two workpieces 1.3 and 1.4 together to form a compound panel.

After the welded seam 3 has been made, the panel leaves the welding station S at a rate of travel $V_2$. This speed $V_2$ should, again, usually be higher than the welding speed $V_s$, so that handling both of panels and of workpieces 1.3 and 1.4 away from the station Q can be speeded up, and, in any case, there are always sufficient workpieces 1.3 and 1.4 available for processing, so that the station Q is able to operate continuously.

Both $V_1$ and $V_2$ may be equal to the speed $V_n$ at which the tracks 6.1,6.2,6.3 are operated between welding operations. This is possible chiefly where both the clearance a between the two rear guide rollers 8.3 and the clearance b between the two front deflecting rollers 8.1 can be varied. That is to say, the tracks 6.1,6.2,6.3 open whenever no welding is taking place, so that welded panels can be removed from deeper within the apparatus and new workpieces can be inserted into the apparatus more deeply.

We claim:

1. Method for connecting two workpieces together by a welded seam, in which the workpieces are held in a welding station between opposed tracks comprising a plurality of members, running around guide rollers in a conveying direction, characterized in that a clearance in the section of the path of the tracks which is first in the conveying direction is changed upon insertion of the workpieces between the tracks.

2. Method according to claim 1, characterized in that the tracks are driven between welding operations at a different speed from the welding speed.

3. Method according to claim 2, characterized in that said speed between operations is higher than the welding speed.

4. Method according to claim 1, characterized in that a clearance between the guide rollers which come after the welding operation in the conveying direction, is changed for removal of welded workpieces.

5. Method according to claim 1, characterized in that the workpieces for the welding station are fed to the tracks at a different speed from the welding speed.

6. Method according to claim 1, characterized in that, after welding, the workpieces are removed from the tracks at a different speed from the welding speed.

7. Method according to claim 5, characterized in that the feed speed and the removal speed are approximately equal to the speed of the tracks between welding operations.

* * * * *